United States Patent [19]

Wasielewski et al.

[11] 4,227,953
[45] Oct. 14, 1980

[54] METHOD OF FABRICATING AIR FILTERS

[75] Inventors: Stanley J. Wasielewski, Clay; Stephen M. Hladik, Liverpool, both of N.Y.

[73] Assignee: Cambridge Filter Corp., Syracuse, N.Y.

[21] Appl. No.: 856,674

[22] Filed: Dec. 2, 1977

[51] Int. Cl.³ .................. B65H 45/20; B32B 31/12; B01D 46/52; B01D 39/14
[52] U.S. Cl. .................. 156/227; 55/497; 55/500; 55/502; 55/DIG. 31; 156/298; 156/303.1; 210/493 B; 210/493 R
[58] Field of Search .................. 156/227, 298, 303.1; 55/497, 500, 502, DIG. 31; 210/493 B, 493 R

[56] References Cited

U.S. PATENT DOCUMENTS

| 2,720,937 | 10/1955 | Root, Jr. | 55/500 |
| 2,884,091 | 4/1959 | Baldwin | 55/500 |
| 3,494,113 | 2/1970 | Kinney | 55/497 |
| 3,581,479 | 6/1971 | Goulet et al. | 55/500 |

FOREIGN PATENT DOCUMENTS 781194 8/1957 United Kingdom ............ 55/497

Primary Examiner—John T. Goolkasian
Assistant Examiner—Robert A. Dawson
Attorney, Agent, or Firm—Charles S. McGuire

[57] ABSTRACT

High efficiency air filters are fabricated by forming two end assemblies from rectangular wall members with side plates attached to extend upwardly from opposite sides thereof. A removable wall of expendable material such as ordinary masking tape is applied to the other two sides, extending between the ends of the side plates to form a shallow pan which is filled with a liquid adhesive. The pleated filter media is attached along its two side edges to side wall members having notched ends for mating with the side plates of the end assemblies. One edge of the filter media between the two side walls is immersed in the pool of adhesive and the side walls are attached to the side plates. After the adhesive hardens, the masking tape is removed and the other end assembly is attached in the same manner.

7 Claims, 6 Drawing Figures

METHOD OF FABRICATING AIR FILTERS

BACKGROUND OF THE INVENTION

The present invention relates to high efficiency air filters and, more specifically, to methods of fabricating air filter assemblies to obtain an impermeable seal between the media and the surrounding frame.

In certain enclosed spaces it is essential that the air be completely free of any solid contaminants whatsoever, down to the sub-micron range. In order to insure that the required level of purity is maintained, it is the usual practise to install filters of the so-called "Absolute" type through which all air entering the enclosed space must pass. While filter media which will remove from air passing therethrough all particles down to the required size is readily available, it is difficult and costly to provide a completely air-tight seal around the entire periphery of the media where it meets the supporting frame.

In filters of the type with which the present invention is concerned, the filter core comprises an extended sheet of filter media formed into a series of zig-zag pleats with a corrugated spacer between the opposing walls of each of the pleats. This filter core is supported in a box-like frame, usually of plywood, but also in some constructions of heavy cardboard or sheet metal. The entire media edge, both ends and the continuous pleat edges, must be continuously sealed to the frame to avoid bypass. While sealing the media ends to the side frame members presents no great problem since an area of planar, surface-to-surface contact is available for such attachment, the deep (e.g., 12 inches) pleats have sinuous edges of considerable total length that require continuous, air-tight sealing to the adjacent surface of the frame. Thus, sealing the edges to the top and bottom frame members is considerably more difficult since there is essentially only line contact between the pleat edges and opposing frame surfaces.

One means for effecting the required sealing between media and frame which is currently in commercial use is that disclosed in U.S. Pat. No. 3,581,479 of Roger T. Goulet, issued June 1, 1971, and assigned to applicant's assignee. This involves forming a groove or channel across the inner faces of the top and bottom frame members for insertion of an elongated nozzle through which a liquid adhesive is injected as the nozzle is withdrawn from the groove. The amount of adhesive injected is sufficient to fill the groove and flow across the entire surface of the frame member to form a continuous bond, upon hardening, with the opposing pleated edges of the media. While filters constructed in this manner are satisfactory in operation, a degree of skill and care must be exercised in applying the adhesive as the nozzle is withdrawn from the groove in order to insure that a complete bond is achieved. Thus, fabrication in this manner requires trained individuals and is subject to operator error. Also, the effectiveness of the seal is dependent upon the flow characteristics of the adhesive and positioning of the assembly as the adhesive is applied and before it hardens.

It is a principal object of the present invention to provide a method of fabricating filter assemblies of the type discussed above which reliably forms a complete bond between filter media and frame in a manner more economical and simple than those previously used.

A further object is to provide a method of attaching a filter media edge to the opposite surface of a frame member wherein a liquid adhesive is applied to the frame member surface, and may therefore be visually observed for completeness and uniformity of coverage, prior to contact therewith of the media edge.

Other objects will in part be obvious and will in part appear hereinafter.

SUMMARY OF THE INVENTION

In accordance with the foregoing objects, the invention contemplates an air filter assembly of the type having a core of pleated media with corrugated spacers between the walls of each pleat and a box-like frame supporting the media and bonded thereto about the entire periphery with an air-tight seal. In fabrication, the media is pleated, the spacers inserted and the two ends parallel to the pleat folds are adhesively secured in surface-to-surface relation to the two members which are to form the sides of the filter frame in conventional fashion. The end assemblies which will form the top and bottom of the frame are prepared by attaching two relatively narrow strips along the side edges of the rectangular frame members, flush with one surface thereof and extending a short distance beyond the other edge. Temporary walls are formed by applying adhesive tape, such as paper masking tape, along the front and rear edges of the frame member, extending between the ends of the two narrow strips, the tape having edges coplanar with those of the strips, whereby the planar frame member, strips and tapes form a shallow pan-like structure.

A quantity of liquid adhesive sufficient to completely cover the surface of the frame member and fill the pan-like structure to a desired depth is poured into the structure from any suitable container. The filter media with frame side members attached is then positioned with one of the sinuous media edges in continuous contact with the adhesive and underlying surface of the frame member. The frame side members are notched at their ends to mate with the strips which are attached along the edges of the end assembly. The side members are attached on each side to the strips and/or the frame end member. When the adhesive has hardened sufficiently, the unit is inverted and assembled in the same manner with the opposite end assembly into which the adhesive has previously been poured.

DETAILED DESCRIPTION

Figure 1:
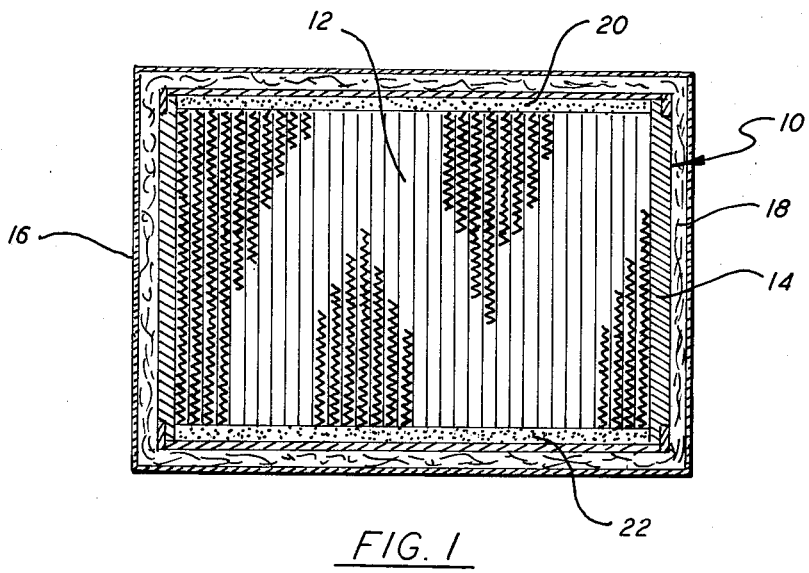
FIG. 1 is a front elevational view of a filter unit fabricated according to the present invention as it appears in use, supported within a wall section defining an opening for the filter frame.

Referring now to the drawings, in FIG. 1 is shown an air filter unit, designated generally by reference numeral 10, comprising filter core 12 and surrounding frame 14. As is the usual practice, filter unit 10 is supported within a generally concentric housing 16 with a tightly compressed mat or body of fibrous material 18 interposed between filter unit 10 and housing 16 as disclosed, for example, in U.S. Pat. No. 2,884,091 of W. W. Baldwin, assigned to applicant's assignee. The material and degree of compaction of material 18 effectively fills and prevents air flow through the space between frame 12 and wall section 16. Filter core 12 comprises a continuous sheet of filter media folded at uniformly spaced intervals in zig-zag fashion to form a plurality of pleats, and a spacer of corrugated metal foil interposed between the walls of each pleat, as shown in the aforementioned patents. Both sides of the filter media are securely bonded by a suitable adhesive to the side members of frame 14 and the sinuous edges along the top and bottom of the pleats are likewise bonded by an initially liquid, but hardenable adhesive to the top and bottom frame members. The continuous layers of adhesive at the top and bottom may be seen in FIG. 1 and are denoted by reference numerals 20 and 22, respectively.

Figure 2:
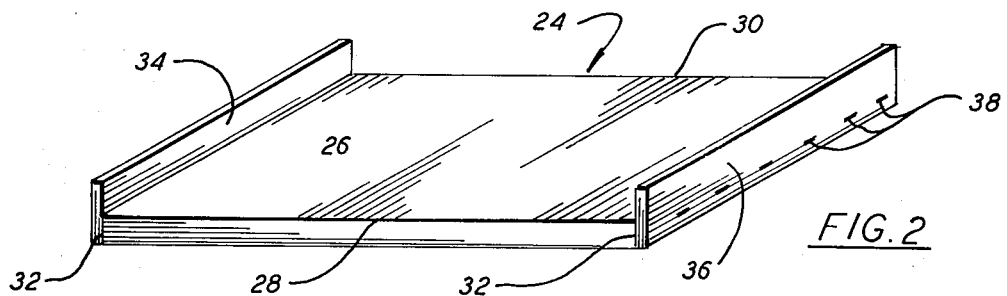
FIGS. 2-4 are a series of perspective views illustrating the steps in preparation of the filter unit end assemblies.
Figure 3:
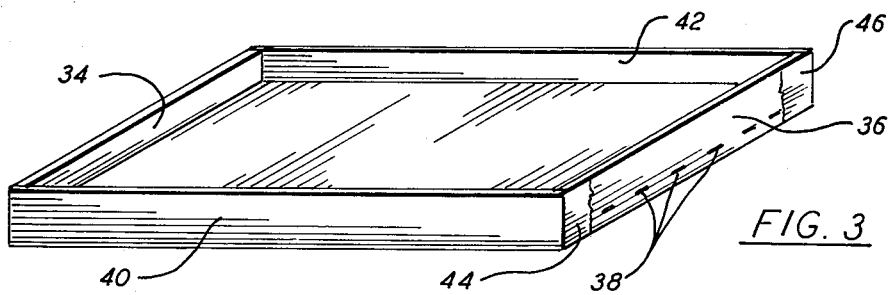
Figure 4:
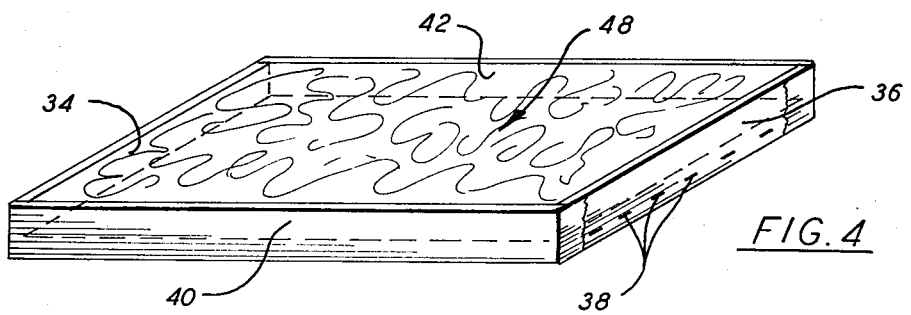

Turning now to FIGS. 2-4, the sequence of steps in preparing the end assemblies of frame 14 for assembly with the filter core and frame side members is illustrated. Square or rectangular end plate 24, preferably a flat sheet of plywood, has a planar upper surface 26, front and rear edges 28 and 30, respectively, and side edges 32. Strips 34 and 36, of somewhat thinner wood than end plate 24, are attached by any convenient means such as staples 38 to both side edges 32 as indicated in FIG. 2 with the front and rear edges of the strips flush with front and rear edges 28 and 30. The lower edges of strips 34 and 36 are flush with the lower surface of end plate 24 and the upper edges of the strips are somewhat higher, preferably about one-half inch, than surface 26.

Temporary walls are then formed along the front and rear edges of end plate 24 with any convenient, expendable materials. For example, two strips of inexpensive, pressure-sensitive tape 40 and 42, such as paper masking tape, may be applied in the manner shown in FIG. 3. The tape, or other material used to form the temporary walls, is preferably of the same width as strips 34 and 36 being applied to front and rear edges 28 and 30 of end plate 24, extending between the ends of the two side straps and preferably extending a short distance around the corner of end plate 24 as indicated at 44 and 46. Thus, a shallow (approx. ½" deep), pan-like structure is formed by surface 26 and bounding side strips 34 and 36, and tapes 40 and 42. Into this confined space is poured a liquid adhesive or sealing agent which will cure at room temperature. Although the particular type of adhesive used is of no consequence to the present invention, a number of commercially available substances being satisfactory, the most commonly employed adhesive for such applications is a combination of a liquid resin and a liquid polyamide or amine as a hardener. The two components are mixed shortly before being poured into the cavity or pan formed by the end assembly and will harden within a few minutes thereafter. The pan is preferably filled to substantially its entire depth, the pool of liquid adhesive being indicated in FIG. 4 by reference numeral 48.

Figure 5:
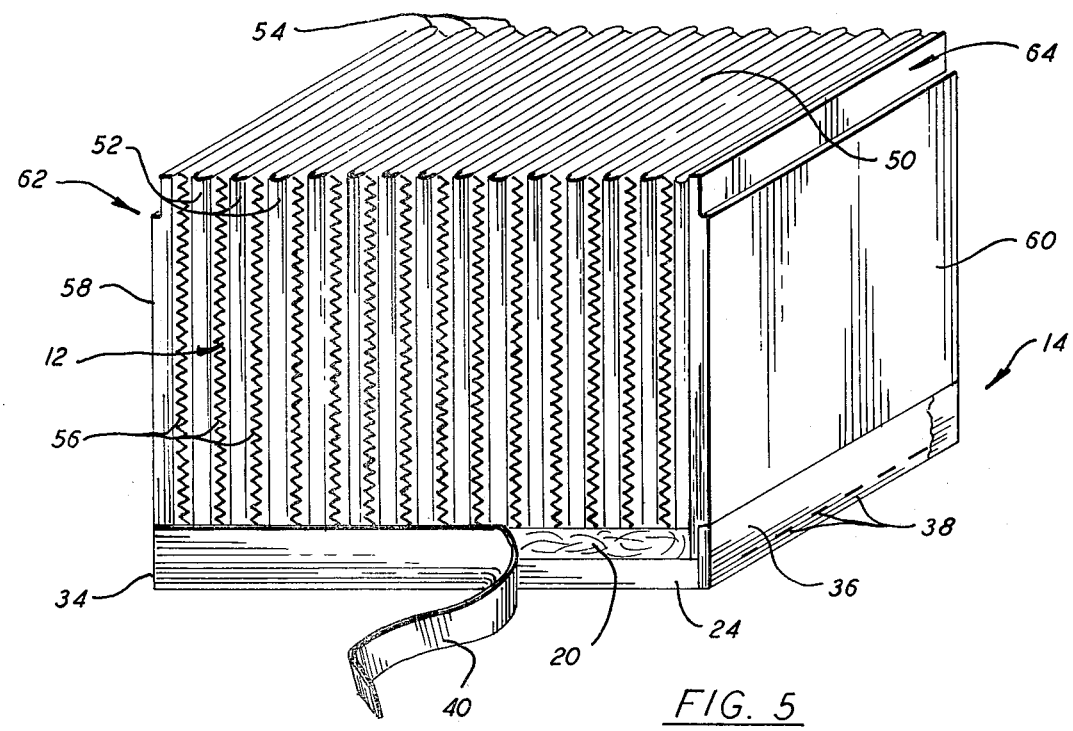
FIG. 5 is a perspective view showing a subsequent step in the fabrication, with the filter core and frame side members assembled with one of the frame ends.

The filter core 12 has been previously formed and is seen in more detail in FIG. 5. A continuous sheet of filter media 50 of the desired filtering efficiency is folded at equally spaced intervals in zig-zag fashion, forming accordian pleats, whereby at each of the front and rear sides of the core a fold line alternates with an open space between the two walls of each pleat. The fold lines along the front and rear sides of filter core 12 are denoted in FIG. 5 by reference numerals 52 and 54, respectively. In accordance with conventional practise, spacer members 56 are placed into the open spaces between fold lines at both the front and rear sides to provide free passage of air between the walls of the pleats.

The terminal side edges of pleated filter core 12 are adhesively and continuously attached to the inner surfaces of filter frame side plates 58 and 60, whereby air cannot bypass media 50 at the sides. With filter core 12 attached to side plates 58 and 60, the entire edge of media 50 running between folds 52 and 54 at one end of the filter core is immersed in adhesive 48, preferably until the media edge contacts as closely as possible surface 26 of end plate 24. It will be noted from FIG. 5 that side plates 58 and 60 are notched adjacent both ends of each along their entire length, as generally indicated at 62 and 64. The notches have a depth equal to the thickness of strips 34 and 36, and a height equal to the height of strips 34 and 36 above surface 26. Thus, side plates 58 and 60 mate with strips 34 and 36, respectively, to form a unitary side structure for the filter frame 14.

Figure 6:
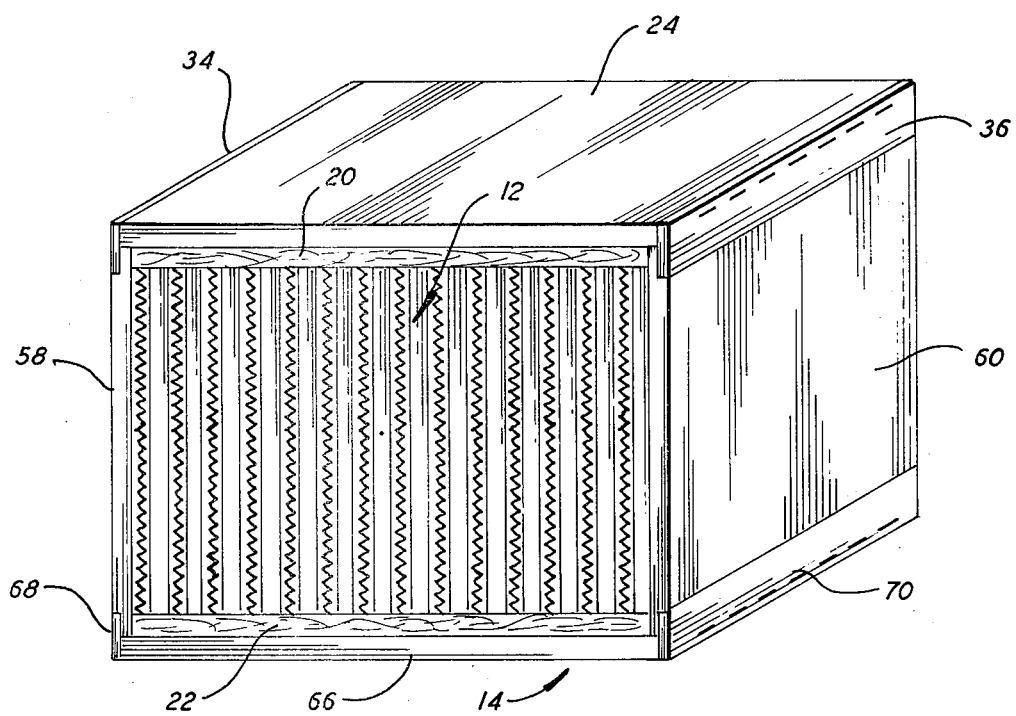
FIG. 6 is a perspective view of the completed unit of filter core and frame.

When the adhesive was hardened sufficiently, tapes 40 and 42 may be removed, as indicated in FIG. 5, leaving impervious, hardened adhesive layer 20 in which one entire pleated edge of media 50 is entirely encapsulated, thereby forming a 100% effective seal. The unit is then inverted, whereby end plate 24 becomes the top plate of filter frame 14, as indicated in FIG. 6, and assembled in the same manner with the second end assembly. The latter includes bottom plate 66 and strips 68 and 70 which, together with tape strips applied such as strips 40 and 42, form the pan-like structure filled with liquid adhesive which has hardened, as the finished unit is shown in FIG. 6, to form hardened adhesive layer 22. Filter unit 10 is then mounted in housing 16 in the usual manner and is ready for installation. Since a 100% efficient seal is formed between the filter and frame by assembly thereof according to the method of the present invention, higher flow rates may be used with the same amount of media, or, conversely, the same flow rates may be used with a smaller amount of media as compared to the same filters fabricated according to prior art methods.

What is claimed is:

1. A method of fabricating a high-efficiency air filter unit comprising:
   (a) forming a filter core by folding a continuous sheet of filter media at evenly spaced intervals in accordian fashion, thereby providing a plurality of side-by-side pleats;
   (b) forming first and second shallow, pan-like structure from planar sheets of substantially the same rectangular dimensions as the ends of said core formed by the zig-zag pleat edges with four relatively narrow strips, one attached to and extending upwardly from each of the four side edges of said sheets;
   (c) filling said first pan-like structure to a predetermined depth with a first quantity of liquid adhesive hardenable to a solid state;
   (d) submersing one of said core ends in said first quantity of adhesive within said first pan-like structure to an extent at least sufficient to immerse all of the zig-zag pleat edges of said one end in said liquid adhesive;
   (e) allowing said first quantity of adhesive to harden;

(f) filling said second pan-like structure to said predetermined depth with a second quantity of said liquid adhesive;

(g) inverting said core with said first pan-like structure adhered thereto and submersing the opposite of said core ends in said second quantity of adhesive within said second pan-like structure to an extent at least sufficient to immerse all of the zig-zag pleat edges of said opposite end in said liquid adhesive;

(h) allow said second quantity of adhesive to harden; and (i) assembling a pair of rectangular end plates of substantially the same dimensions as the pleat walls of said filter core in sealing engagement with the endmost pleats of said core and with said planar sheets along adjacent edges of said plates and sheets, thereby forming a four-sided structure enclosing said core in sealing engagement on four sides.

2. The invention according to claim 1 and including the further step of inserting a spacer member between opposing walls of each of said pleats prior to placing said one core end in said first quantity of adhesive.

3. The invention according to claim 2 and including the further step of removing two of said four strips from each of said first and second pan-like structures subsequent to hardening of said first and second quantities of adhesive.

4. The invention according to claim 3 wherein said two strips are those bordering the free edges of said sheets after assembly therewith of said end plates.

5. The invention according to claim 4 wherein said two strips are formed of pressure sensitive adhesive tape.

6. The invention according to claim 1 and further including the step of forming notched portions along two opposite edges of said end plates for mating engagement with said strips along the edges of said sheets along which said opposite edges of said end plates are assembled.

7. The invention according to claim 6 wherein said end plates are assembled in sealing relation with said core prior to placing said core ends in said adhesive, said notched portions being along the outer surfaces of said end plates for mating engagement with said strips on the inside thereof.

* * * * *